(No Model.) 2 Sheets—Sheet 1.
F. W. SCOTT, F. W. SCOTT, Jr. & E. G. SCOTT.
BRINE EVAPORATOR.

No. 575,854. Patented Jan. 26, 1897.

Witnesses.
E. P. Hubbard.
G. A. Vauberschmidt.

Inventors.
Frank Walter Scott
Earnest George Scott and
Frank Walter Scott Jr
By Whitaker & Prevost Attys (No Model.) 2 Sheets—Sheet 2.
F. W. SCOTT, F. W. SCOTT, Jr. & E. G. SCOTT.
BRINE EVAPORATOR.

No. 575,854. Patented Jan. 26, 1897.

Witnesses
Inventors

UNITED STATES PATENT OFFICE.

FRANK WALTER SCOTT AND FRANK WALTER SCOTT, JR., OF LONDON, AND ERNEST GEORGE SCOTT, OF LIVERPOOL, ENGLAND.

BRINE-EVAPORATOR.

SPECIFICATION forming part of Letters Patent No. 575,854, dated January 26, 1897.

Application filed July 7, 1896. Serial No. 598,347. (No model.) Patented in England June 29, 1893, No. 12,774.

*To all whom it may concern:*

Be it known that we, FRANK WALTER SCOTT and FRANK WALTER SCOTT, Jr., of London, and ERNEST GEORGE SCOTT, of Liverpool, England, subjects of the Queen of Great Britain, have invented new and useful Improvements in Evaporating Brine and other Liquors and Apparatus Therefor, (for which we have obtained a patent in Great Britain, No. 12,774, dated June 29, 1893;) and we do hereby declare that the following is a full, clear, and exact description of the invention, which will enable others skilled in the art to which it appertains to make and use the same.

Our invention relates to the evaporation of brine and other liquids *in vacuo.*

The apparatus hitherto generally used for effecting such evaporation has had the heating system contained within the evaporating vessel, and it is found that with cetain liquors and under certain conditions the crystals deposit upon the tubes of the heating system and so impair the efficiency of the same.

The object of our invention is to prevent this deposit upon the heating-tubes, and we effect this by heating the liquid to be treated to the required temperature before introducing it into the evaporating vessel, (thereby dispensing with the usual heating system in the vessel,) so that when the liquid does enter the said vessel and come under the influence of the vacuum therein it will immediately vaporize, crystallizable matter which it contains being deposited upon the bottom of the vessel.

In carrying out our invention we employ an evaporating vessel of any ordinary or desirable shape, but without the system of heating-tubes, and in a second vessel we place a system of heating-tubes adapted to be heated by steam in the usual manner. The liquid to be evaporated is circulated through the heating vessel by a pump or other feeding device, and after being heated is discharged therefrom into the evaporating vessel, the discharge being so proportioned to the feed that the liquid will always escape from the heating vessel to the evaporating vessel under pressure.

To enable our invention to be fully understood, we will describe the same by reference to the accompanying drawings, in which—

Figure 1:
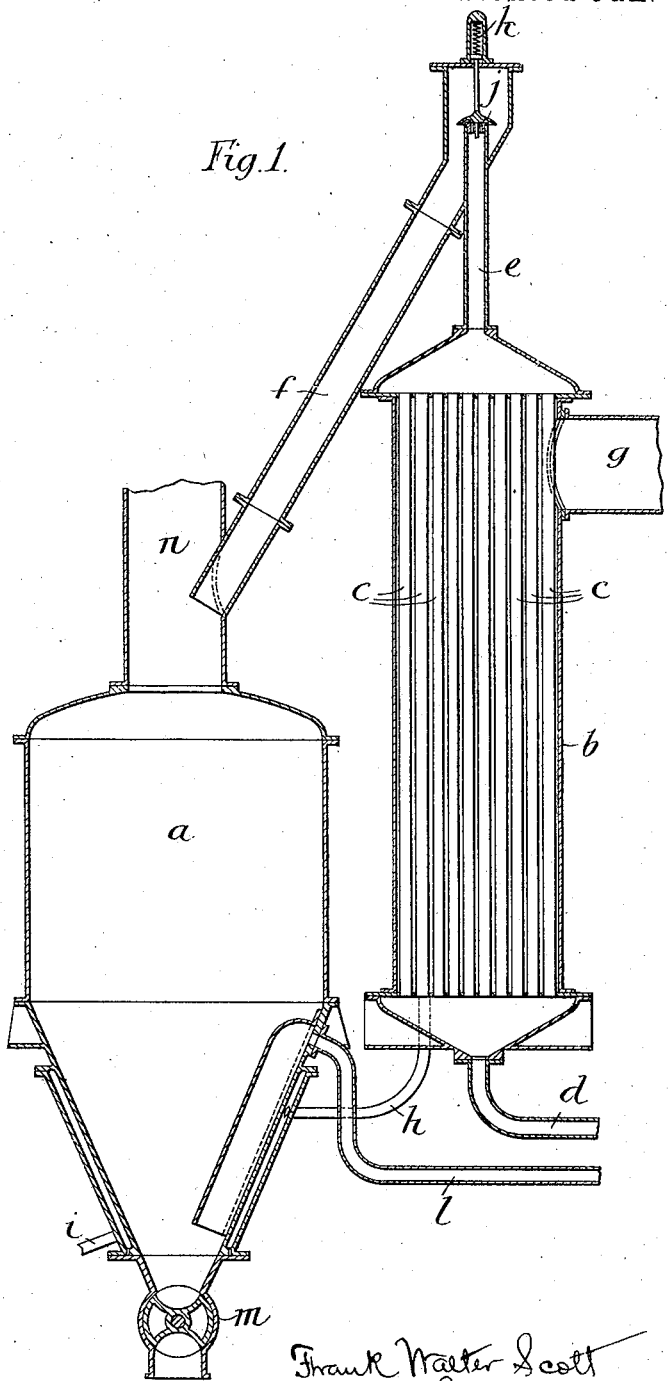
Figure 2:
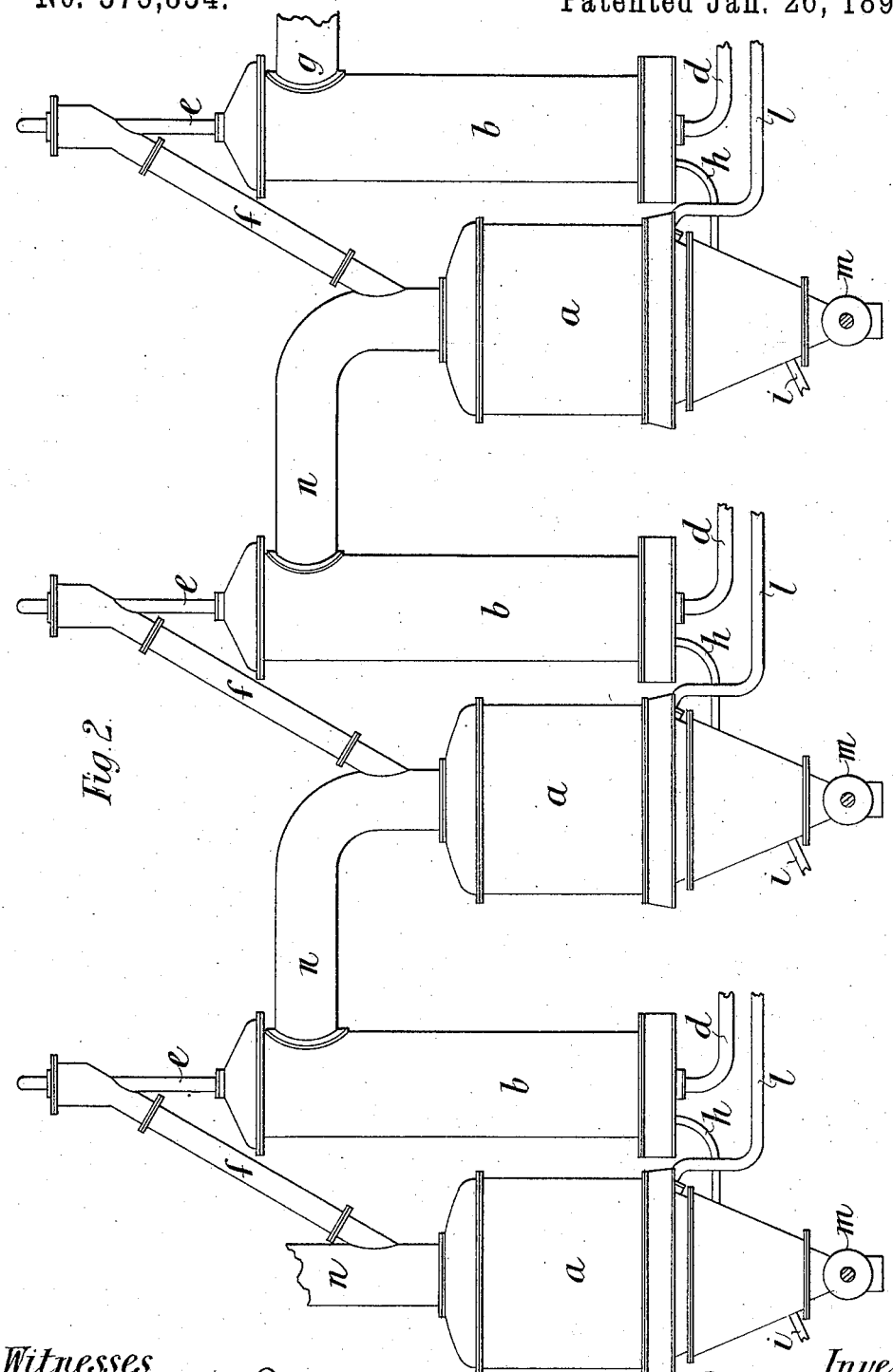

Figure 1 is a vertical section of an evaporating apparatus constructed according to our invention, and Fig. 2 is an elevation showing several sets of such apparatus arranged for multiple effect.

$a$ is the evaporating vessel proper, which, as shown in the drawings, is of ordinary construction, except that it has no internal system of heating-tubes, and $b$ is the heating vessel, having extending through it a series of heating-tubes $c\ c$, through which the liquid to be heated is circulated, such liquid being introduced at the bottom of the vessel $b$ through the pipe $d$ by means of a suitable pump and discharged therefrom through the pipe $e$, whence it flows into the vessel $a$ through the tube $f$.

$g$ is the inlet for the steam for heating the vessel $b$, and $h$ is a pipe communicating with the steam-space between the circulating-tubes $c\ c$ and with the jacket surrounding the lower part of the vessel $a$, the said pipe $h$ serving to carry off the water of condensation from the vessel $b$ to the said jacket, whence it escapes through the pipe $i$.

$j$ is a valve which is seated upon the top of the discharge-pipe $e$ of the heating vessel $b$ and which is acted upon by a spring $k$, the pressure of which is proportionate to the pressure which it is desired to maintain in the said heating vessel $b$.

With the arrangement hereinbefore described it will be understood that the liquid in the heating vessel $b$ being constantly full and under pressure no vaporization can take place therein, so that no crystallizable matter will be deposited upon the tubes $c\ c$, the deposit taking place in the vessel $a$.

$l$ is a pipe through which the liquid may be drawn from the evaporating vessel $a$ by the pump and returned to the heating vessel $b$, in order that it may be concentrated in the said vessel $a$ to the required extent, and to prevent the crystallized matter from being returned to the heating vessel by the pump we provide the evaporating vessel with a discharge-valve $m$ of the kind described in the specification of former British Letters Patent granted to us, No. 6,478 of 1892, whereby the crystals are removed from time to time as they deposit.

The arrangement of a series of vessels for multiple effect will be readily understood by reference to Fig. 2, where it will be noticed that the heating vessel $b$ belonging to each evaporating vessel $a$ except the first one is heated by the steam escaping from the preceding evaporating vessel $a$ through the pipe $n$.

Having now particularly described and ascertained the nature of our said invention and in what manner the same is to be performed, we declare that what we claim is—

In a brine-evaporating apparatus the combination with the evaporating vessel provided with a water-jacket, of a separate heating vessel provided with steam-circulating passages, means for supplying brine to said heating vessel, a pipe connecting the heating vessel with the evaporating vessel, a spring-actuated valve in said pipe for maintaining the brine in said heating vessel under pressure to prevent crystallization therein, a pipe connecting the steam-passages of said heating vessel with the said water-jacket for conducting the water of condensation to said water-jacket and a discharge-pipe for said water-jacket, substantially as described.

In witness whereof we, the said FRANK WALTER SCOTT, FRANK WALTER SCOTT, Jr., and ERNEST GEORGE SCOTT, have hereunto set our hands.

FRANK WALTER SCOTT.
FRANK WALTER SCOTT, JUNIOR.
ERNEST GEORGE SCOTT.

Witnesses to the signature of Frank Walter Scott:
    G. F. REDFERN,
    JOHN E. BOUSFIELD.

Witnesses to the signature of Frank Walter Scott, Jr.:
    WM. HY. JORDAN,
    H. W. BURSTOW.

Witnesses to the signature of Ernest George Scott:
    A. ALBUTT,
    E. CHURCHER.